(12) United States Patent
Plaza

(10) Patent No.: US 7,116,824 B2
(45) Date of Patent: Oct. 3, 2006

(54) DETECTION OF A PATTERN IN A DIGITAL IMAGE

(75) Inventor: Laurent Plaza, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 679 days.

(21) Appl. No.: 10/278,626

(22) Filed: Oct. 23, 2002

(65) Prior Publication Data

US 2003/0091238 A1    May 15, 2003

(30) Foreign Application Priority Data

Oct. 23, 2001    (FR) ................................... 01 13676

(51) Int. Cl.
*G06K 9/62*    (2006.01)
(52) U.S. Cl. ...................... 382/209; 382/218
(58) Field of Classification Search ................ 382/103, 382/173, 181, 195, 209, 218, 224, 232, 250
See application file for complete search history.

(56) References Cited

U.S. PATENT DOCUMENTS

| | | | |
|---|---|---|---|
| 5,561,475 A * | 10/1996 | Jung | ............ 348/699 |
| 5,613,015 A * | 3/1997 | Suzuki et al. | ............ 382/173 |
| 5,805,727 A | 9/1998 | Nakano | ............ 382/195 |
| 6,049,363 A | 4/2000 | Courtney et al. | ............ 348/700 |
| 6,088,483 A * | 7/2000 | Nakano et al. | ............ 382/209 |
| 6,477,275 B1 * | 11/2002 | Melikian et al. | ............ 382/217 |
| 6,584,224 B1 * | 6/2003 | Sun et al. | ............ 382/217 |
| 6,658,148 B1 * | 12/2003 | Fung et al. | ............ 382/209 |

OTHER PUBLICATIONS

French Search Report from French Patent Application No. 01/13676, filed Oct. 23, 2001.
Patent Abstracts of Japan, vol. 2002, No. 02, Apr. 2, 2002 & JP 2001 297325 A (Mitsubishi Electric Corp.).
Patent Abstracts of Japan, vol. 1999, No. 08, Jun. 30, 1999 & JP 11 085989 A (Canon Inc.).

\* cited by examiner

*Primary Examiner*—Daniel Miriam
(74) *Attorney, Agent, or Firm*—Lisa K. Jorgenson; William R. McClellan; Wolf, Greenfield & Sacks, P.C.

(57) ABSTRACT

A method for detecting a pattern in a digital image by successive comparison of the content of current windows with the content of at least one reference window representative of the pattern, the reference window containing values of variance or standard deviation of sub-blocks of pixels of the pattern and the current windows containing values of variance or standard deviation of sub-blocks of pixels of the image, the sub-blocks being of the same size in the current and reference windows.

12 Claims, 1 Drawing Sheet

DETECTION OF A PATTERN IN A DIGITAL IMAGE

BACKGROUND OF THE INVENTION

1. Field of the Invention

The present invention generally relates to digital image processing. More specifically, the present invention relates to the detection, in a digital image, of any predetermined pattern.

2. Discussion of the Related Art

A known method of such a detection is described hereafter in relation with FIGS. 1A and 1B.

FIG. 1A schematically illustrates a pattern 1, the possible presence of which is desired to be determined in a digital image. FIG. 1B illustrates a digital image 2 in which pattern 1 of FIG. 1A is searched. It is assumed, in this example, that image 2 does include pattern 1 and that image 2 has dimensions greater than those of pattern 1.

To detect the presence of pattern 1 in image 2, a reference image or window 3 containing only pattern 1 is used. The detection is performed by scanning image 2 with a current window 4 of same dimensions as reference window 3 and by comparing the content of the two windows 3 and 4. Such a comparison consists of evaluating the correlation degree between reference window 3 and current window 4. For this purpose, the Euclidean distance pixel by pixel, which is cumulated on the current and reference windows, is used. More specifically, for each pixel of the current window, the square of a distance $ED^{i,j}$ defined by the following relation is calculated:

$$ED^2_{i,j} = (P_{i,j} - R_{i,j})^2, \text{ where}$$

$P_{i,j}$ is the value of the level of grey of the current pixel of current window 4, and where $R_{i,j}$ is the value of the level of grey of the pixel of the reference window of same coordinates i,j in reference window 3.

Then, the squares of distances $ED_{i,j}$ are added on vertical dimension M (i ranging from 1 to M) and on horizontal dimension N (j ranging between 1 and N) of the current window, to deduce therefrom the Euclidean distance ED from a window to the other. This amounts to applying the following formula:

$$ED = \sqrt{\sum_{i=1}^{M} \sum_{j=1}^{N} ED^2_{i,j}}.$$

To enable locating the same patterns of different sizes, sum ED may be normalized. The energy of the current and reference windows is then, for example, used. The "energy" of a current or reference window designates the sum of the squares of the levels of grey of all the pixels in the considered window.

To localize pattern 1, Euclidean distance ED is calculated for all possible positions of the current window in the image. Pattern 1 then is at the location corresponding to minimum distance ED.

A disadvantage of this method is the great number of calculations to be performed. Indeed, assuming that A is the number of lines of image 2, and B the number of columns of image 2, and assuming that M is the number of lines of reference window 3 and N its number of columns, the total number of calculations is equal to the total number of pixels of reference image 3, that is, product MN, by the number of possible spatial positions for current window 4, that is, M*N*(A−M)*(B−N).

Another disadvantage of this method is its high sensitivity to luminosity conditions upon acquisition of the processed image or of the reference window. Indeed, as previously discussed, the correlation search is based on a difference of levels of grey. A variation in the acquisition conditions of images to be processed may locally modify the results by causing wrong detections or wrong rejections.

SUMMARY OF THE INVENTION

The present invention aims at providing a method for detecting a pattern in a digital image which is simpler (fewer calculations and less memory) to implement than known methods.

The present invention also aims at providing such a method which is less sensitive to luminosity conditions (luminance) of the processed image and of the pattern to be detected.

To achieve these and other objects, the present invention provides a method for detecting a pattern in a digital image by successive comparison of the content of current windows with the content of at least one reference window representative of the pattern, the reference window containing values of variance or standard deviation of sub-blocks of pixels of the pattern and the current windows containing values of variance or standard deviation of sub-blocks of pixels of the image, the sub-blocks being of the same size in the current and reference windows.

According to an embodiment of the present invention, the method includes the steps of:

dividing the image and the pattern into sub-blocks of the same dimensions;

forming a reference window containing the variances or standard deviations of the levels of grey of the pixels of each sub-block of the pattern; and successively comparing the values of the reference window with values of at least one current window, of same size as the reference window, and containing the variances or standard deviations of the levels of grey of pixels of sub-blocks of the image.

According to an embodiment of the present invention, the values contained in the current windows are calculated along a scanning of the image.

According to an embodiment of the present invention, the values of the current windows are all calculated before performing the comparisons.

According to an embodiment of the present invention, the steps of division, formation, and comparison are performed for several sizes of sub-blocks.

The present invention also provides a system for detecting a pattern in a digital image, including means for implementing the method of any of the embodiments of the present invention.

The foregoing objects, features and advantages of the present invention, will be discussed in detail in the following non-limiting description of specific embodiments in connection with the accompanying drawings.

DETAILED DESCRIPTION

For clarity, the same elements have been designated with same references in the different drawings.

Figure 3A:
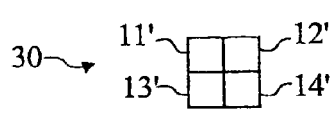
FIGS. 3A and 3B illustrate a subsequent step of the embodiment of FIGS. 2A and 2B.
Figure 3B:
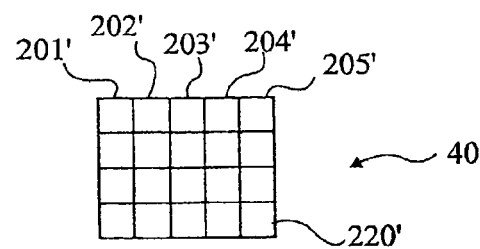
Figure 4:
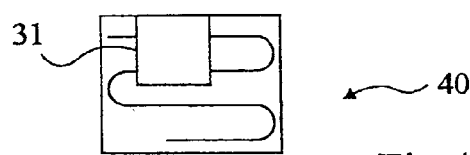
FIG. 4 illustrates a subsequent step of the embodiment of FIGS. 3A and 3B.

An embodiment of a method of pattern detection in a digital image according to the present invention will be detailed hereafter in relation with FIGS. 2 to 4.

Figure 1A:
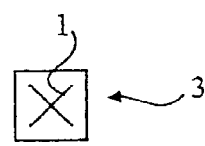
FIGS. 1A and 1B schematically illustrate a known method of pattern detection in a digital image.
Figure 1B:
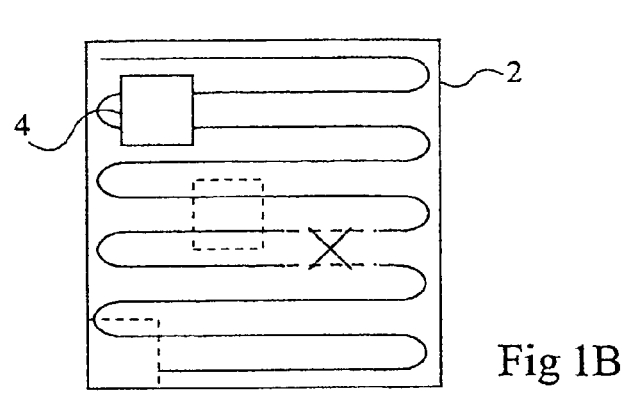
Figure 2A:
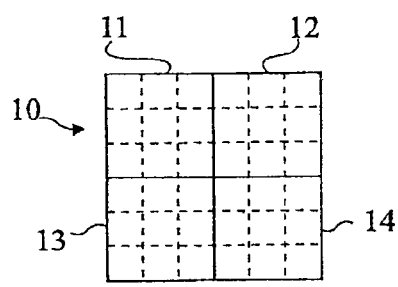
FIGS. 2A and 2B schematically illustrate a step of an embodiment of a method of pattern detection in a digital image according to the present invention.

It is considered as a non-limiting example that a pattern, not shown (for example, similar to the pattern of FIG. 1A), contained in a square matrix 10 having a six-pixel side illustrated in FIG. 2A, is desired to be detected.

Figure 2B:
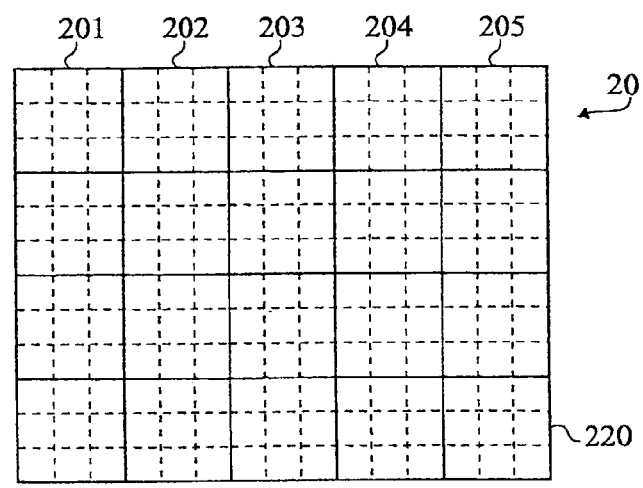

FIG. 2B illustrates, in the form of a pixel matrix comprised of fifteen columns and twelve lines, a digital image 20 in which the presence of the pattern of FIG. 2A is desired to be detected.

As illustrated in FIGS. 2A and 2B, the method according to the present invention starts by the dividing of matrix 10 and of image 20 into sub-blocks of the same dimensions. As a non-limiting example, it is here considered that each sub-block is a square with a three-pixel side. Of course, there may remain an edge problem if the image does not contain an integral number of sub-blocks of same dimensions. It is then for example possible, as desired, to take no account of the edge pixels on either side of the image by recentering the sub-blocks, to process the rest like a sub-block of smaller size, or to ignore the edge.

Matrix 10 of FIG. 2A is thus divided into four sub-blocks of nine pixels each. For the needs of the description, the four sub-blocks are designated from left to right and from top to bottom with reference numbers 11, 12, 13, and 14. The separation between neighboring sub-blocks is illustrated by full lines. The separation between pixels within each sub-block is illustrated in dotted lines.

Similarly, image 20 of FIG. 2B is divided into twenty sub-blocks of nine pixels each. In FIGS. 2A and 2B, the twenty sub-blocks are shown. However, only the five sub-blocks of the first line and the last sub-block of the last line are designated with reference numbers 201, 202, 203, 204, 205, and 220.

Then, for each sub-block 11, 12, 13, 14 of matrix 10, the variance or standard deviation (square root of the variance) of the nine pixels that it includes is calculated.

The choice between variance and standard deviation depends, for example, on the memory assigned to the storage. The variance represents more data but saves the calculation of a square root. For simplification, reference will be made hereafter to the variance, but all the following description also applies to the standard deviation.

Variance V is given by relation:

$$V = \frac{1}{N \cdot M} \sum_{k=1}^{M \cdot N} (P_k - \overline{P})^2,$$

where $P_k$ represents the level of grey of pixel k of the sub-block containing N*M pixels and where $\overline{P}$ represents the average of the sub-block in terms of level of grey, that is:

$$\overline{P} = \frac{1}{N \cdot M} \sum_{k=1}^{M \cdot N} P_k.$$

A reference image 30, illustrated in FIG. 3A, formed of as many pixels as matrix 10 includes sub-blocks, is then formed. In the considered example, reference image 30 thus includes four pixels 11', 12', 13', 14'. The value of each pixel of reference image 30 is the previously-calculated variance of the corresponding sub-block of matrix 10.

According to a first embodiment of the present invention, a reduced image 40, illustrated in FIG. 3B, formed of as many pixels, here, twenty, as there are sub-blocks in digital image to be processed 20, is similarly formed. Each of the twenty pixels 201', 202', 203', 204', 205', 220' of reduced image 40 has the value of the variance of the corresponding sub-block of initial digital image 20.

As illustrated in FIG. 4, the detection of the pattern in digital image 20 then comprises scanning reduced image 40 with a current window 31 of same dimensions as reference image 30 and of comparing the pixel values of current window 31 with those of reference window 30. This comparison is performed by calculating the Euclidean distance. The compared values however are variance values. In practice, but this changes nothing to the principle of the present invention, account is preferentially taken of the energy of the current and reference windows in the variance values.

According to a second embodiment, only matrix 10 including the pattern to be searched is divided into sub-blocks. Matrix 10 is then alone converted to form a reference image 30. The digital image to be processed 20 is then scanned with a window having the dimension of matrix 10. This scanning window is divided into a same number of sub-blocks as reference image 30 includes pixels (that is, as there are sub-blocks in matrix 10), that is, in the preceding example, 4. For each successive scanning window of image 20, the variances associated with each of the sub-blocks forming it are calculated and the results are compared with the content of reference image 30. The difference with respect to the first embodiment is that the variance calculations are performed along the scanning of image 20. If necessary, the values are however temporarily stored to be reused for the next line(s).

An advantage of the present invention is to reduce the complexity, that is, the number of primary calculations or number of loops per cycle to be performed, to be able to discriminate the pattern in the digital image. Thus, as compared to the previously-described known method, considering sub-blocks with nine pixels as in the previously-described example, the number of calculations is reduced by 9×9, that is, 81 times.

Another advantage of the present invention is that by using the variance, the method becomes resistant to the luminosity level. Indeed, if the luminosity varies uniformly from one image to the other, this variation has no effect upon the variance. Such would not be the case if, instead of the variance, the Euclidean distances of the pixel values were used. Indeed, if a given sub-block having eight of its nine pixel values equal to 100 while the ninth value is equal to 120 is compared to a sub-block in which eight pixel values are equal to 120 and one value is equal to 140, a comparison in Euclidean distances will show a difference of 60 on the window, while a comparison in terms of variance will show an identity between the two windows.

The choice between the two embodiments depends on the application and especially on whether it is desired to privilege a reduction of the number of calculations or of the required memory. The second embodiment has the advantage of requiring less memory. Further, it enables interrupting the search, and thus the calculations, as soon as the pattern has been found.

The maximum reduction factor which can be implemented is linked to the lowest admissible scale applied to the searched pattern. This lowest scale defines the maximum number of calculations. It should however be noted that at least two pixels will always be required to be able to perform a variance calculation. Accordingly, the sub-blocks will have a minimum dimension containing at least two pixels. A mere reduction by such sub-blocks to two pixels however already provides a reduction by a factor four of the number of calculations.

As compared to conventional methods that exploit the differences between levels of grey pixel by pixel, the present invention exploits the pattern texture and a non-directive gradient of the levels of grey.

The sub-blocks used should not be too large. Indeed, beyond a given dimension, which can depend on the pattern and on the considered image, although the calculation time is considerably reduced, the variance will be calculated within each sub-block over too large a number of points exhibiting significant intervals, and precision will be lost. The image reduction limit depends, among others, on the details characteristic of this pattern.

The detection method of the present invention may be applied, for example, to the exact locating of a face in a digital image in which this face has been roughly pre-located, for example, by means of a skin color detection.

Preferably, a method according to the present invention is successively implemented for several sizes of the searched pattern. These different sizes may correspond to different reductions and then result in different current and reference windows, the image (40) remaining the same. Preferably, a control is performed by implementing any one of the known correlation methods for each size of the original pattern by applying this method, level of grey to level of grey, at the precise locations where the detection method of the present invention suggests the presence of the searched pattern for this size. In this case, a standardization of the respective correlation coefficients with respect to the size of the reference window containing the pattern is applied.

Of course, the present invention is likely to have various alterations, modifications, and improvement which will readily occur to those skilled in the art. In particular, the present invention is not limited to the previously discussed numerical examples. The present invention applies to the searching, in any set of digital data of any dimension A*B, for a pattern of dimension N*M, M being a number of pixels aligned along a first direction, for example, vertical, smaller than homologous number A of the set and N being a number of pixels aligned along a second direction, for example, horizontal, smaller than homologous number B of the processed set.

Further, as indicated previously, the dimensions and numbers of pixels of the sub-blocks may be modified in any appropriate manner according to the application. Similarly, the direction of the scanning of the digital image by a reference image 31 is indicated in FIG. 4 as an example only.

However, the positions of values in the reduced (current or reference) images must correspond to the respective positions of the sub-blocks of which they express the variance or the standard deviation.

Further, the implementation of the method of the present invention by any hardware and/or software means is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for detecting a pattern in a digital image by successive comparison of the content of current windows with the content of at least one reference window representative of the pattern, the reference window containing values of variance or standard deviation of sub-blocks of pixels of the pattern and the current windows containing values of variance or standard deviation of sub-blocks of pixels of the image, the sub-blocks being of the same size in the current and reference windows.

2. The detection method of claim 1, including the steps of:
dividing the image and the pattern into sub-blocks of same dimensions;
forming a reference window containing the variances or standard deviations of the levels of grey of the pixels of each sub-block of the pattern; and
successively comparing the values of the reference window with values of at least one current window, of same size as the reference window, and containing the variances or standard deviations of the levels of grey of pixels of sub-blocks of the image.

3. The method of claim 2, wherein the values contained in the current windows are calculated along a scanning of the image.

4. The method of claim 2, wherein the values of the current windows are all calculated before performing the comparisons.

5. The method of claim 2, wherein the steps of division, formation, and comparison are performed for several sizes of sub-blocks.

6. A system for detecting a pattern in a digital image, according to the method of claim 1.

7. A method for detecting a pattern in a digital image, comprising:
defining a reference window containing variance or standard deviation values representative of sub-blocks of the pattern;
defining a current window of equal size as the reference window, the current window containing variance or standard deviation values representative of sub-blocks of the image, the sub-blocks of the pattern and the sub-blocks of the image having equal dimensions; and
successively comparing the values of the sub-blocks of the reference window with the values of the sub-blocks of the current window.

8. A method as defined in claim 7, wherein comparing the values of the sub-blocks of the reference window with the values of the sub-blocks of the current window is performed for multiple current windows of the image, further comprising judging detection of the pattern in the digital image based on the comparison.

9. A method as defined in claim 7, further comprising dividing the image into sub-blocks to form a reduced image and scanning the reduced image with the current window.

10. A method as defined in claim 7, further comprising scanning the image with the current window and calculating the variance or standard deviation values of sub-blocks of the current window at each location of the current window during scanning.

11. A method as defined in claim 7, wherein the variance or standard deviation values are representative of levels of gray in the sub-blocks.

12. A method as defined in claim 7, wherein defining a reference window, defining a current window, and comparing the values of the sub-blocks of the reference window with values of the sub-blocks of the current window are repeated for sub-blocks of different sizes.

* * * * *